(12) United States Patent
Avanzi

(10) Patent No.: US 9,411,440 B2
(45) Date of Patent: Aug. 9, 2016

(54) DIGITAL ULTRASONIC EMITTING BASE STATION

(71) Applicant: QUALCOMM Incorporated, San Diego, CA (US)

(72) Inventor: Roberto Avanzi, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/533,535

(22) Filed: Nov. 5, 2014

(65) Prior Publication Data

US 2016/0054819 A1 Feb. 25, 2016

Related U.S. Application Data

(60) Provisional application No. 62/040,977, filed on Aug. 22, 2014.

(51) Int. Cl.
*G06F 3/033* (2013.01)
*G06F 3/0354* (2013.01)
*G06F 3/01* (2006.01)

(52) U.S. Cl.
CPC ............ *G06F 3/03545* (2013.01); *G06F 3/017* (2013.01)

(58) Field of Classification Search
CPC ..... G06F 3/0433; G06F 3/0418; G06F 3/038; G06F 3/043; G06F 3/0436; G06F 3/03545; G06F 2203/0384; G01S 5/186; G01S 5/22
USPC ........... 345/156–184, 419; 181/122; 324/671; 438/149
See application file for complete search history.

(56) References Cited

U.S. PATENT DOCUMENTS 5,451,723 A * 9/1995 Huang ................... G06F 3/0436
178/18.04
5,889,511 A * 3/1999 Ong ........................ G06F 3/045
345/173

(Continued)

FOREIGN PATENT DOCUMENTS

EP        1228480 A1    8/2002
JP      2002041229 A    2/2002
WO    WO-0065530 A1   11/2000

OTHER PUBLICATIONS

Anonymous: "Least squares—Wikipedia, the free Encyclopedia", Wikipedia, Mar. 30, 2013, pp. 1-16, XP055111205, Retrieved from the Internet: URL: http://en.wikipedia.org/w/index.php?title=Least_squares&oldid=547861529, p. 1-2.

(Continued)

*Primary Examiner* — Prabodh M Dharia
(74) *Attorney, Agent, or Firm* — Haynes and Boone, LLP

(57) ABSTRACT

An acoustic tracking system is provided that includes receivers that detect first acoustic signals from a first set of transmitters disposed on a digital pen and second acoustic signals from a second set of transmitters disposed on a base station. The acoustic tracking system also includes a processing component that defines a two-dimensional plane on which the base station lies and determines a three-dimensional position of the digital pen relative to the base station. The processing component projects the three-dimensional position of the digital pen onto the two-dimensional plane and records, based on the projected three-dimensional position, the three-dimensional position of the digital pen relative to the base station, where the recorded three-dimensional position of the digital pen represents an object representative of movement of the digital pen.

29 Claims, 6 Drawing Sheets

(56) References Cited

U.S. PATENT DOCUMENTS

| | | | | |
|---|---|---|---|---|
| 5,920,524 | A * | 7/1999 | Stein | G01V 1/001 181/122 |
| 6,998,856 | B2 * | 2/2006 | Sterling | G06F 3/044 324/671 |
| 8,248,389 | B2 | 8/2012 | Raif et al. | |
| 8,542,219 | B2 | 9/2013 | Carl et al. | |
| 2002/0135570 | A1 * | 9/2002 | Iisaka | G06F 1/1626 345/177 |
| 2002/0192009 | A1 | 12/2002 | Tuli | |
| 2004/0191967 | A1 * | 9/2004 | Wake | H01L 21/76264 438/149 |
| 2005/0110775 | A1 * | 5/2005 | Zuta | G01S 11/14 345/177 |
| 2005/0150697 | A1 * | 7/2005 | Altman | G06F 3/011 178/19.02 |
| 2007/0075968 | A1 * | 4/2007 | Hall | G06F 3/046 345/157 |
| 2009/0078473 | A1 | 3/2009 | Overgard et al. | |
| 2009/0225100 | A1 * | 9/2009 | Lee | G06F 3/0488 345/660 |
| 2009/0239581 | A1 | 9/2009 | Lee | |
| 2010/0053169 | A1 * | 3/2010 | Cook | G06F 3/16 345/440.1 |
| 2011/0002191 | A1 * | 1/2011 | DeMaio | G01S 7/5273 367/1 |
| 2011/0096043 | A1 * | 4/2011 | Raif | G06F 3/03545 345/179 |
| 2011/0304537 | A1 * | 12/2011 | Eruchimovitch | G06F 3/03545 345/158 |
| 2011/0310101 | A1 * | 12/2011 | Prange | G01V 99/00 345/420 |
| 2012/0075234 | A1 * | 3/2012 | Yi | G06F 3/0416 345/174 |
| 2012/0182269 | A1 * | 7/2012 | Kent | G06F 3/0436 345/177 |
| 2012/0206330 | A1 * | 8/2012 | Cao | G06F 3/03883 345/156 |
| 2012/0299820 | A1 * | 11/2012 | Dahl | G06F 3/011 345/156 |
| 2013/0114380 | A1 * | 5/2013 | Bryger | G06F 3/017 367/199 |
| 2013/0128042 | A1 * | 5/2013 | Bridge | H04N 5/232 348/143 |
| 2014/0191967 | A1 * | 7/2014 | Rhee | G06F 3/03545 345/158 |
| 2015/0054794 | A1 * | 2/2015 | Li | G06F 3/017 345/177 |
| 2015/0062091 | A1 * | 3/2015 | Li | G01S 5/186 345/177 |
| 2015/0177856 | A1 * | 6/2015 | Kajitani | G06F 3/03545 345/158 |

OTHER PUBLICATIONS

International Search Report and Written Opinion—PCT/US2015/041188—ISA/EPO—Oct. 12, 2015.

* cited by examiner ical field

DIGITAL ULTRASONIC EMITTING BASE STATION

CROSS REFERENCE TO RELATED APPLICATIONS

This application claims the benefit of priority from U.S. provisional patent application No. 62/040,977, filed Aug. 22, 2014, which is incorporated herein by reference.

TECHNICAL FIELD

Embodiments disclosed herein are generally directed to tracking, in an acoustic tracking system, a position of a digital pen relative to a base station.

BACKGROUND

A user may take notes using a computer. While the user may be able to type quickly, adding graphics, arrow, tables, or other objects to her notes may be difficult using the computer. The user may perform these actions more quickly on paper than on a laptop screen or even a tablet.

Nowadays, users may use a digital pen and an "electronic notepad" for note taking. Electronic notepads may enable the user to easily markup notes and draw objects onto a computer screen. Electronic notepads, however, may be cumbersome to use and may not give the feel of real writing to the user. For example, in a conventional electronic notepad system, an electronic notepad may include a clipboard that holds a piece of paper. The user may sketch on the paper while the electronic notepad digitally records the user's sketches. The user tethers the electronic notepad to a computer to transfer the data recorded by the electronic notepad to the computer. Tethering the electronic notepad to the computer in order to transfer the data, however, may be inconvenient for the user.

Additionally, the electronic notepad system may be expensive because of the onboard processing circuitry on the electronic notepad. For example, the electronic notepad may consume a lot of power.

SUMMARY

Consistent with some embodiments, there is provided an example acoustic tracking system. The acoustic tracking system includes a first plurality of receivers that detects first acoustic signals from a first set of transmitters disposed on a digital pen and a second plurality of receivers that detects second acoustic signals from a second set of transmitters disposed on a base station. The acoustic tracking system also includes a processing component that defines, based on the second acoustic signals, a two-dimensional plane on which the base station lies, determines, based on the first and second acoustic signals, a three-dimensional position of the digital pen relative to the base station, and projects the three-dimensional position of the digital pen onto the two-dimensional plane. The acoustic tracking system further includes an application controller that records, based on the projected three-dimensional position of the digital pen onto the two-dimensional plane, the three-dimensional position of the digital pen relative to the base station, where the recorded three-dimensional position of the digital pen represents an object representative of movement of the digital pen.

Consistent with some embodiments, there is provided an example method of recording an object based on movement of a digital pen relative to a base station. The method includes detecting, by a first plurality of receivers coupled to a computing device, first acoustic signals transmitted from a first set of transmitters disposed on a digital pen. The method also includes detecting, by a second plurality of receivers coupled to the computing device, second acoustic signals transmitted from a second set of transmitters disposed on a base station. The method further includes defining, based on the second acoustic signals, a two-dimensional plane on which the base station lies. The method also includes determining, based on the first and second acoustic signals, a three-dimensional position of the digital pen relative to the base station. The method further includes projecting the three-dimensional position of a tip of the digital pen onto the two-dimensional plane. The method also includes recording the three-dimensional position of the tip based on the projecting, where the recorded three-dimensional position of the tip represents an object representative of movement of the digital pen.

Consistent with some embodiments, there is provided a computer-readable medium having stored thereon computer-executable instructions for performing operations, including: detecting first acoustic signals transmitted from a first set of transmitters disposed on a digital pen; detecting second acoustic signals transmitted from a second set of transmitters disposed on a base station; defining, based on the second acoustic signals, a two-dimensional plane on which the base station lies; determining, based on the first and second acoustic signals, a three-dimensional position of the digital pen relative to the base station; projecting the three-dimensional position of the digital pen onto the two-dimensional plane; and recording the three-dimensional position of the digital pen based on the projecting, where the recorded three-dimensional position represents an object representative of movement of the digital pen.

Consistent with some embodiments, there is provided a system for recording an object based on movement of a digital pen relative to a base station. The system includes means for detecting first acoustic signals transmitted from a first set of transmitters disposed on a digital pen. The system also includes means for detecting second acoustic signals transmitted from a second set of transmitters disposed on a base station. The system further includes means for defining, based on the second acoustic signals, a two-dimensional plane on which the base station lies. The system also includes means for determining, based on the first and second acoustic signals, a three-dimensional position of the digital pen relative to the base station. The system further includes means for projecting the three-dimensional position of the digital pen onto the two-dimensional plane. The system also includes means for recording the three-dimensional position of the digital pen based on the projecting, where the recorded three-dimensional position of the digital pen represents an object representative of movement of the digital pen.

DETAILED DESCRIPTION

Figure 1:
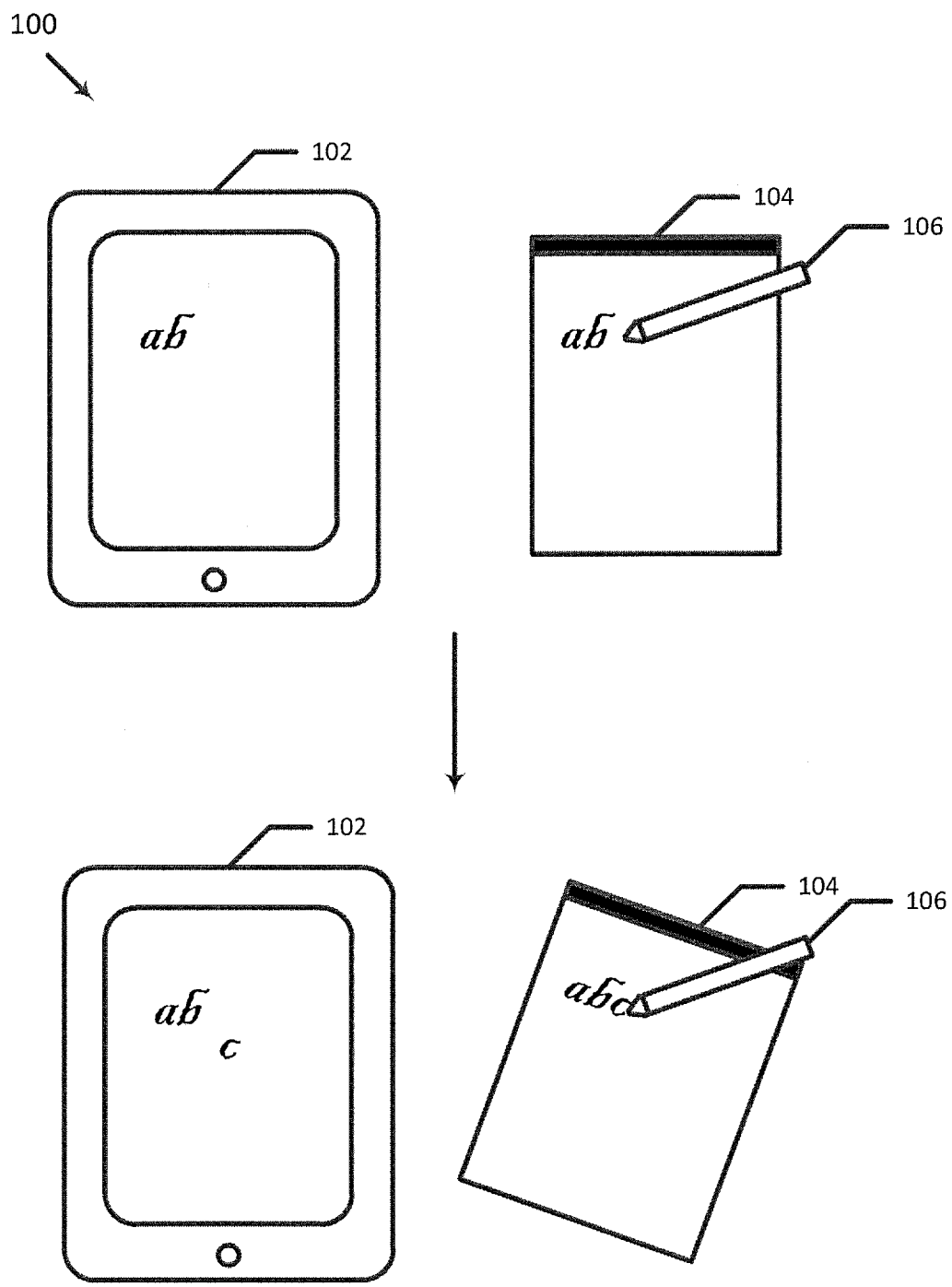
FIG. 1 is a diagram illustrating an example acoustic tracking system.

In the drawings, elements having the same designation have the same or similar functions.

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating an example acoustic tracking system 100. Acoustic tracking system 100 includes a computing device 102, a notepad 104, and a digital pen 106. One or more transmitters that transmit acoustic signals may be disposed on digital pen 106, and one or more receivers that detect the acoustic signals may be disposed on computing device 102. A user may write on notepad 104 using digital pen 106. As the user writes on notepad 104 using digital pen 106, digital pen 106 may transmit acoustic signals that are detected by computing device 102. Based on the acoustic signals transmitted from digital pen 106, computing device 102 may determine a position of digital pen 106 and record what the user is writing on notepad 104.

In FIG. 1, the user wrote "ab" on notepad 104, which is shown on a display of computing device 102. If the user moves notepad 104 and continues writing, the objects drawn by the user after the movement of notepad 104 may not be properly aligned with what is displayed on computing device 102. An object may refer to text, graphics, or other symbols. For example, the "c" drawn by the user after notepad 104 was moved is not aligned with "ab" displayed on computing device 102. To solve this problem, it may be desirable for computing device 102 to determine a position of notepad 104 relative to the position of digital pen 106.

It may be difficult, however, for computing device 102 to determine the position of notepad 104 relative to the position of digital pen 106. A possible solution to this problem may be to provide a fold cover for computing device 102 such that when the user opens the fold cover, notepad 104 is on one side and computing device 102 is on the other side of the fold cover. It may be inconvenient for the user, however, to carry the fold cover around and also to use notepad 204 in the fold cover. Additionally, the additional expense of purchasing a fold cover may add onto the expense of using acoustic tracking system 100.

Figure 2:
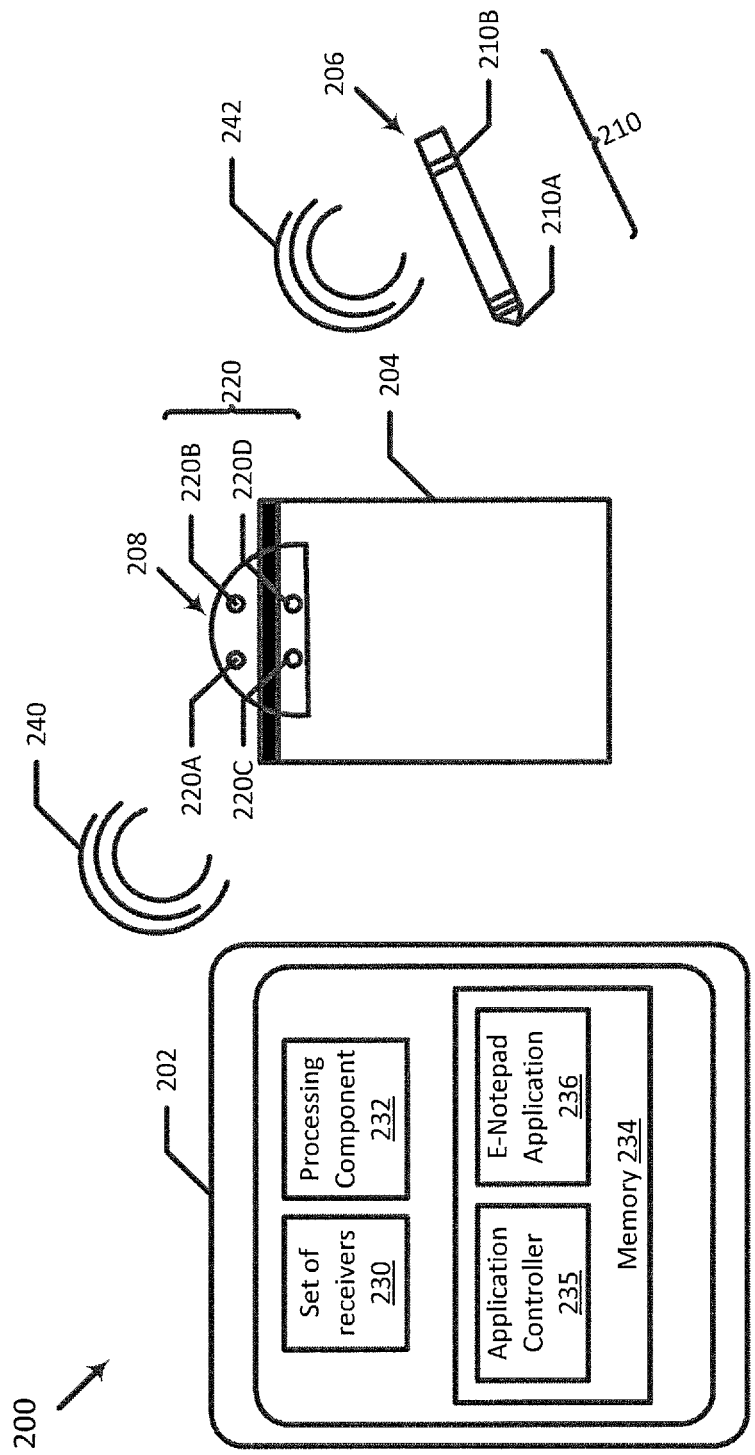
FIG. 2 is a diagram illustrating an acoustic tracking system, consistent with some embodiments.

FIG. 2 is a diagram illustrating an acoustic tracking system 200, consistent with some embodiments. Acoustic tracking system 200 may be used with devices such as smartphones, tablets, laptops, desktops, and personal digital assistants (PDAs). One example of an acoustic signal-based position tracking system is a digital pen having one or more acoustic signal transmitters and a base station having one or more acoustic signal transmitters, where the acoustic signal transmitters are in communication with one or more receivers coupled to a computing device. In such an example, the digital pen and base station may interact with the computing device by transmitting acoustic signals, as will be discussed further below.

In FIG. 2, acoustic tracking system 200 includes a computing device 202, a notepad 204, a digital pen 206, and a base station 208. Digital pen 206 includes a set of transmitters 210 including transmitter 210A and transmitter 210B that transmit acoustic signals. Transmitter 210A may be located near or at the tip of the digital pen, and transmitter 210B may be located along a length of the digital pen. Transmitter 210A may be located within a proximity to a tip of the digital pen. For example, transmitter 210A may be located within 0.5 millimeters of the tip of the digital pen. A transmitter may also be referred to as an emitter.

Although two transmitters are illustrated as being disposed on digital pen 206, other embodiments having more than two transmitters are within the scope of this disclosure. In principle, more than two transmitters may be disposed on the digital pen if power, design complexity, and system robustness allow for it. More interference, however, from adjacent transmitters on the digital pen may arise and may depend on the pattern signal design. Orthogonal sequences with ideal correlation properties may be used for the transmitter pattern design. Further, a higher quantity of transmitters may destroy the assumption of zero mean range measurement noise assumption and result in higher noise and less position tracking accuracy.

Base station 208 includes a set of transmitters 220 including transmitters 220A-220D that transmit acoustic signals. Although four transmitters are illustrated as being disposed on base station 208, other embodiments having two or more transmitters are within the scope of this disclosure. A user may attach base station 208 to notepad 204 and write on notepad 204 using digital pen 206. If user moves notepad 204, base station 208 also moves along with notepad 204.

Both digital pen 206 and base station 208 emit acoustic signals that are received by computing device 202. Computing device 202 includes a set of receivers 230 for picking up the signals transmitted by set of transmitters 210 and set of transmitters 220. Set of receivers 230 may be coupled to computing device 202 and may continuously run such that they are always ready to receive input from the transmitters when computing device 202 is turned on. In another example, set of receivers 230 does not continuously run but wakes up periodically to receive input from the transmitters.

In some embodiments, set of transmitters 210 and/or set of transmitters 220 may transmit a signal pattern of acoustic waves, such as an ultrasonic signal. The transmitters may be any suitable ultrasonic device that includes one or more ultrasonic transducers to generate ultrasonic signals (e.g., speakers). Set of receivers 230 may be any suitable acoustic receivers such as a microphone, and set of transmitters 210 and/or set of transmitters 220 may transmit ultrasonic signals to multiple microphones coupled to computing device 202.

Computing device 202 may include a processing component 232 and a memory 234. In some embodiments, processing component 232 may be one or more processors, central processing units (CPUs), image signal processors (ISPs), micro-controllers, or digital signal processors (DSPs), graphics processing units (GPUs), and audio signal processors, which may include analog and/or digital audio signal processors. Processing component 232 may be provided as hardware, software, or firmware, or combinations thereof in various embodiments.

Memory 234 may include a system memory component, which may correspond to random access memory (RAM), an internal memory component, which may correspond to read only memory (ROM), and an external or static memory, which may correspond to optical, magnetic, or solid-state memories, for example. Memory 234 may correspond to a non-transitory machine-readable medium that includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which processing component 232 is capable of reading.

In some embodiments, processing component 232 extracts acoustic signals received by each receiver of set of receivers 230. For each acoustic signal received at a receiver, processing component 232 may determine which transmitter transmitted the respective acoustic signal. The received acoustic signals may be compared to an expected signal by processing component 232 according to instructions stored in memory 234 and an expected signal stored in memory 234 or generated by processing component 232, for example.

Memory 234 may include an application controller 235 and an electronic notepad application 236. Application 236 receives input from application controller 235 regarding the positions of base station 208 and of digital pen 206 relative to base station 208. Application controller 235 affects operation of an application based on determined positions of base station 208 and of digital pen 206 relative to base station 208.

Computing device 202 is a separate computer from base station 208 and digital pen 206 and processes the acoustic signals received from set of transmitters 210 and set of transmitters 220. It may be advantageous for computing device 202 to perform these calculations rather than digital pen 206 or base station 208 because computing device 202 may have a longer battery life compared to digital pen 206 or base station 208. Additionally, computing device 202 may have a better performing processor compared to digital pen 206 or base station 208. As such, computing device 202's processing power may be leveraged and base station 208 and digital pen 206 may have minimal power requirements. It should also be understood, however, that digital pen 206 may include software that performs some of the calculations that are described as being performed by processing component 232.

Base station 208 transmits acoustic signals 240. In some embodiments, computing device 202 detects, by a plurality of receivers of set of receivers 230, acoustic signals 240 transmitted from set of transmitters 220 disposed on base station 208. Processing component 232 may extract the acoustic signals received by the plurality of receivers and define, based on acoustic signals 240, a two-dimensional plane on which base station 208 lies.

Figure 3:
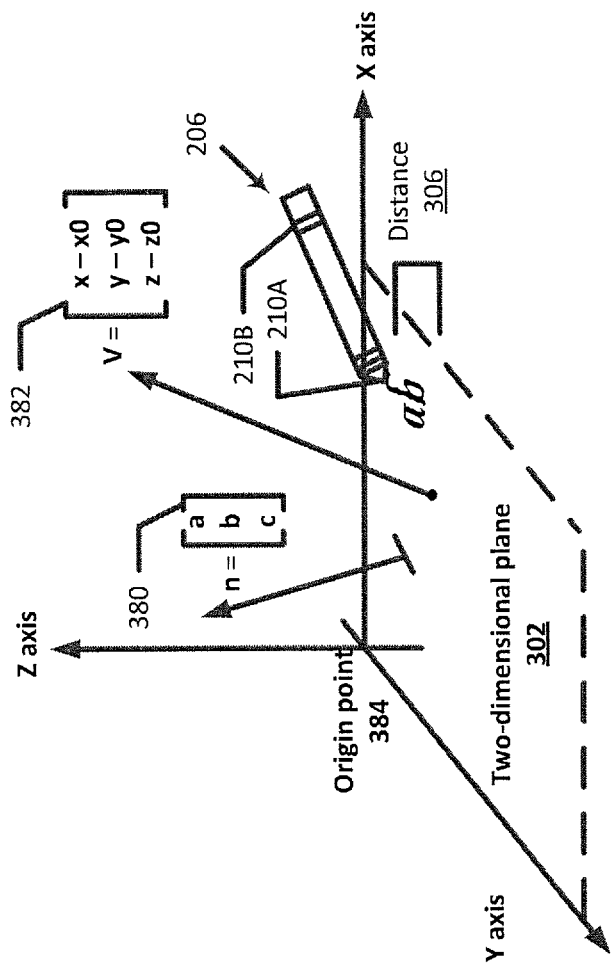
FIG. 3 is a diagram illustrating a two-dimensional plane on which a base station 208, consistent with some embodiments.
Figure 3:
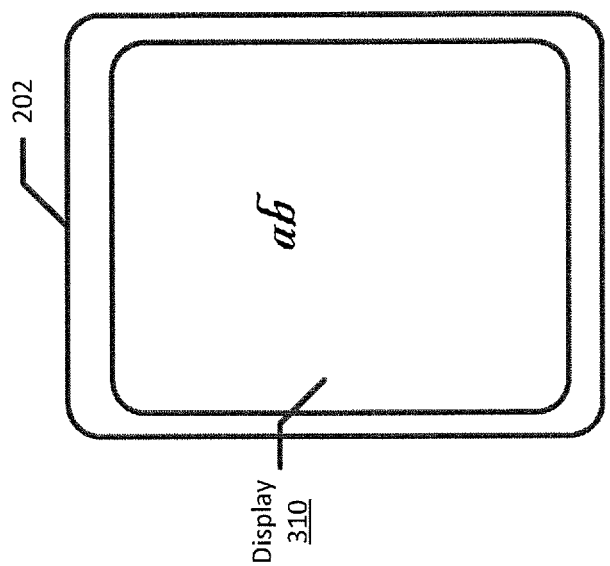

FIG. 3 is a diagram illustrating a two-dimensional plane 302 on which base station 208 lies, consistent with some embodiments. FIGS. 2 and 3 will be discussed together to better explain how objects drawn by the user on notepad 204 using digital pen 206 are captured by computing device 202.

In some embodiments, base station 208 may transmit acoustic signals 240 that may be detected by computing device 202 and used by processing component 232 to define a two-dimensional plane on which base station 208 lies. In particular, processing component 232 may define the two-dimensional plane by determining a location of at least three of the transmitters disposed on base station 208. The position accuracy may be dependent on transducer placement, signal sequence design, and transducer acoustics (e.g., porting and signal-to-noise ratio). It should be understood that the fourth transmitter (e.g., transmitter 220D) may be optional in a three-emitter configuration. The fourth transmitter, however, may provide a more accurate result and may also be used if one of the other transmitters does not have a clear line of sight with receivers coupled to computing device 202.

Each transmitter (of set of transmitters 210 or set of transmitters 220) may transmit a different acoustic signal pattern with respect to each other. The different acoustic signal patterns may help to maintain a clear line of sight between the transmitters and receivers. In some embodiments, a multiplexing technique may be used to properly control the power used by these transmitters. In an example, transmitters may transmit acoustic signals using Time Division Multiple Access (TDMA). For example, a plurality of set of receivers 230 may receive at a first time slot a first ultrasonic signal from a transmitter 220A, receive at a second time slot a second ultrasonic signal from transmitter 220B, and receive at a third time slot a third ultrasonic signal from transmitter 220C, and/or receive at a fourth time slot a fourth ultrasonic signal from transmitter 220C. The transmission of signals at different time slots may reduce the interference noise.

In some embodiments, transmitters may transmit acoustic signals using multiplexing techniques different from TDMA. In an example, transmitters may transmit acoustic signals using Frequency Division Multiplexing (FDM). For example, a plurality of set of receivers 230 may receive at a first frequency sub-band a first ultrasonic signal from transmitter 220A, receive at a second frequency sub-band a second ultrasonic signal from transmitter 220B, receive at a third frequency sub-band a second ultrasonic signal from transmitter 220C, and/or receive at a fourth frequency sub-band a fourth ultrasonic signal from transmitter 220D.

In another example, transmitters 220A-220D may transmit acoustic signals using Phase Division Multiplexing (PDM). For example, a plurality of set of receivers 230 may receive at a first phase of a channel a first ultrasonic signal from transmitter 220A, receive at a second phase of the channel a second ultrasonic signal from transmitter 220B, receive at a third phase of the channel a third ultrasonic signal from transmitter 220C, and receive at a fourth phase of the channel a fourth ultrasonic signal from transmitter 220D. Accordingly, different frequencies or different durations may be used by the transmitters. The acoustic signals may be emitted simultaneously if the transmitters emit at different frequencies relative to each other.

Processing component 232 may calculate a time difference of arrival (TDOA) for the acoustic signals received at the receivers and apply a least square formula to the one or more calculated time difference of arrivals to determine the position of at least three of transmitters 220A, 220B, 220C, and 220D. Although processing component 232 has been described as applying the least square formula, this is not intended to be limiting. Processing component 232 may apply other formulas to determine a more accurate position of base station 208. For example, the Kalman filter may be applied to determine a more accurate position of base station 208. Processing component 232 may then define, based on the position of at least three transmitters of transmitters 220A, 220B, 220C, and 220D, two-dimensional plane 302 on which base station 208 lies.

In an example, transmitter 220A transmits an "origin" acoustic signal that is followed by acoustic signals transmitted by transmitter 220B and then transmitter 220C and then transmitter 220D. The orientation of base station 208 may be determined according to the position of transmitters 220B, 220C, and/or 220D relative to transmitter 220A. For instance, the transmitters disposed on base station 208 may be such that AB>AC, where AB lie in a vertical direction and AC lie in a horizontal direction relative to a portrait-orientated piece of paper. Processing component 232 may be aware of this configuration and use this information to define the two-dimensional plane 302 on which base station 208 lies.

In an embodiment, base station 208 transmits its location continuously via acoustic signals 240. In another embodiment, base station 208 includes a motion sensor (not shown), and set of transmitters 220 is activated when the motion sensor detects that base station 208 has moved. Accordingly, it may be unnecessary for base station 208 to transmit its location continuously, thus reducing power consumption at base station 208. The motion sensor is coupled to the base station. In an example, the motion sensor is disposed on the base station.

In another embodiment, base station 208 includes a button (not shown) that the user presses to instruct set of transmitters 220 to emit acoustic signals. In such an embodiment, it may be unnecessary for base station 208 to transmit its location continuously, thus reducing power consumption at base station 208. Rather, when the user moves notepad 204, the user may inform computing device 202 of notepad 204's new location by pressing the button.

Processing component 232 may compute two-dimensional plane 302. In an example, processing component 232 determines three points, $P_1$, $P_2$, and $P_3$. Point $P_1$ corresponds to the bottom left corner of notepad 204 or of base station 208, point $P_2$ corresponds to the bottom right corner of notepad 204 or of base station 208, and point $P_3$ corresponds to the top left (e.g., of the rectangle) corresponding to notepad 204 or base station 208, respectively. The equation of two-dimensional plane 302 passing through the points $P_1=(x_1,y_1,z_1)$, $P_2=(x_2,y_2,z_2)$, $P_3=(x_3,y_3,z_3)$ is of the form $aX+bY+cZ=d$ and can be obtained by requiring that the values a, b, c, and d satisfy the following equations (1)-(3):

$$ax_1+by_1+cz_1+d=0 \qquad (1),$$

$$ax_2+by_2+cz_2+d=0 \qquad (2),$$

$$ax_3+by_3+cz_3+d=0 \qquad (3),$$

with [a, b, c, d] not being equal to [0, 0, 0, 0], and where $d=-(ax_i=by_i+cz_i)$ for any of i=1, 2, 3. The system of equations formed by equations (1)-(3) are solved up to a multiplicative factor for the four-dimensional vector [a, b, c, d]. In an example, let the first i, j, and k vectors be the unit vectors corresponding to the x, y, and z axes of the three-dimensional space (see x, y, and z axes in FIG. 3). Processing component 232 may determine the two vectors $\overrightarrow{P_1P_2}$ and $\overrightarrow{P_1P_3}$, which are shown in equations (4)-(5):

$$\overrightarrow{P_1P_2}=(x_2-x_1)i+(y_2-y_1)j+(z_2-z_1)k \qquad (4),$$

$$\overrightarrow{P_1P_3}=(x_3+x_1)i+(y_3-y_1)j+(z_3-z_1)k \qquad (5).$$

Two-dimensional plane 302 is the plane that passes through the two vectors $\overrightarrow{P_1P_2}$ and $\overrightarrow{P_1P_3}$ (which lie on the same plane because they have one point in common) and may be computed by determining the plane whose normal is the vector orthogonal to vectors $\overrightarrow{P_1P_2}$ and $\overrightarrow{P_1P_3}$.

The normal vector is the cross product of $\overrightarrow{P_1P_2}$ and $\overrightarrow{P_1P_3}$, which is shown in equation (6):

$$\overrightarrow{P_1P_2} \times \overrightarrow{P_1P_3} = \det\begin{bmatrix} i & j & k \\ x_2-x_1 & y_2-y_1 & z_2-z_1 \\ x_3-x_1 & y_3-y_1 & z_3-z_1 \end{bmatrix} = ai+bj+ck, \qquad (6)$$

Equations (1)-(6) are example equations that may be used when three transmitters are disposed on digital pen 206. As discussed, fewer than or more than three transmitters may be disposed on digital pen 206. If more than three transmitters are disposed on digital pen 206, more complex relations may be used.

Two-dimensional plane 302 is used in conjunction with the three-dimensional position of digital pen 206 to record objects drawn by the user on notepad 204 using the digital pen. In particular, computing device 202 may determine the location of digital pen 206 relative to the two-dimensional plane 302 in order to properly display the drawn objects (whether or not notepad 204 has been moved). Computing device 202 works with two sets of coordinates, one set of coordinates (e.g., three-dimensional location of digital pen 206) which is to be interpreted relative to the other set of coordinates (e.g., two-dimensional plane 302). For example, the three-dimensional coordinates of digital pen 206 may be transformed into a two-dimensional coordinate system that is relative to that of notepad 204 and its spatial orientation. These additional notepad relative coordinates may be made available to applications executing on computing device 202 (e.g., application 236) to record objects drawn by the user on notepad 204 using digital pen 206.

The user may write "on-screen" by physically touching digital pen 206 with notepad 204. As the user writes on notepad 204 using digital pen 206, set of transmitters 210 emit acoustic signals 242, and set of receivers 230 coupled to computing device 202 may detect the emitted signals. Acoustic signals 242 are processed by processing component 232 to derive a three-dimensional position of the digital pen. In particular, processing component 232 may track a position of each of the transmitters disposed on the digital pen and determine a three-dimensional position of a tip of the digital pen (e.g., a location of transmitter 210A).

In some embodiments, computing device 202 detects, by a plurality of receivers of set of receivers 230, acoustic signals 242 transmitted from set of transmitters 210 disposed on digital pen 206. Processing component 232 may extract the acoustic signals received by the plurality of receivers and determine, based on acoustic signals 240 and 242, a three-dimensional position of digital pen 206 relative to base station 208.

Processing component 232 may use TDOA to determine the three-dimensional position of digital pen 206 and also to determine a three-dimensional position of a tip of digital pen 206 relative to base station 208. The position accuracy may be a key performance parameter for the digital pen and may be dependent on transducer placement, signal sequence design, and transducer acoustics (e.g., porting and signal-to-noise ratio). Processing component 232 may use, for example, TDOA and apply a least square formula to the one or more calculated time difference of arrivals to determine the position(s) of transmitters 210A and/or 210B. Other techniques may be used to determine the three-dimensional position of digital pen 206. In another example, processing component 232 may use Time of Flight (TOF) of the transmitted pulses through a line of sight (LOS).

Referring to FIG. 3, processing component 232 may determine a distance 306 between digital pen 206 and two-dimensional plane 302. In an example, two-dimensional plane 302 is defined by equation (7):

$$ax+by+cz+d=0 \qquad (7),$$

and the point $P_4=[x_0, y_0, z_0]$ in space represents the position of the tip of digital pen 206. A normal vector 380 that is normal to two-dimensional plane 302, and a generic vector 382 from two-dimensional plane 302 to the point $P_4$ may be defined for any point (x, y, z) on two-dimensional plane 302 (e.g., satisfies equation (6)). Distance 306 (distance from point $P_4$ to two-dimensional plane 302) may be determined by projecting vector $\vec{v}$ 382 onto normal vector 380 as shown in equation (8):

$$D = |proj_n v| = \frac{|n \cdot v|}{|v|}, \quad (8)$$

which may be simplified to equation (9):

$$D = \frac{|ax_0 + by_0 + cz_0 + d|}{\sqrt{a^2 + b^2 + c^2}}. \quad (9)$$

If distance 306 is smaller than a given threshold $D_0$, point $P_4$ is replaced with its projection, which is shown in equation (10):

$$proj_n v = \frac{n \cdot v}{|n|^2} n = \frac{ax_0 + by_0 + cz_0 + d}{a^2 + b^2 + c^2} [a, b, c]. \quad (10)$$

Distance 306 may be the distance between a point on digital pen 206 (e.g., tip of digital pen 206 or on transmitter 210A or 210B) and two-dimensional plane 302. If distance 306 is within a threshold distance, digital pen 206 may be close enough to notepad 204 to determine that the user is using digital pen 206 to write on notepad 204. In response to determining that distance 306 is within the threshold distance, processing component 232 projects a three-dimensional position of digital pen 206 onto two-dimensional plane 302. Processing component 232 may use the three-dimensional position of a tip of digital pen 206 for the projection. For example, in response to determining that the location of digital pen 206 is close enough to two-dimensional plane 302 (within the threshold distance), processing component 232 may transform the three-dimensional position of the tip of digital pen 206 into a two-dimensional coordinate system that is relative to that of base station 208 and its spatial orientation. Accordingly, even if the location or orientation of notepad 204 changes, the user may continue writing on notepad 204 and computing device 202 may determine the position of digital pen 206 relative to the base station, allowing for proper alignment of the objects drawn on notepad 204.

Processing component 232 may also determine a defined boundary corresponding to notepad 204. In an example, processing component 232 translates the positions of transmitters 220A-220D into a defined boundary. In response to determining that the location of digital pen 206 is within the defined boundary that lies on two-dimensional plane 302, processing component 232 may transform the three-dimensional position of a tip of digital pen 206 into a two-dimensional coordinate system that is relative to that of base station 208 and its spatial orientation. The defined boundary may correspond to a position of notepad 204 and its length and width dimensions.

In an example, processing component 232 determines three points, $P_1$, $P_2$, and $P_3$. Point $P_1$ corresponds to the bottom left corner of notepad 204 or of base station 208, point $P_2$ corresponds to the bottom right corner of notepad 204 or of base station 208, and point $P_3$ corresponds to the top left (e.g., of the rectangle) corresponding to notepad 204 or base station 208, respectively. In an example, the x-axis is $\overrightarrow{P_1 P_2}$, and the y-axis is $\overrightarrow{P_1 P_3}$. Each point $P_i$ has (x, y, z)-coordinates ($x_i$, $y_i$, $z_i$). Points $P_1$, $P_2$, and $P_3$ may be detected and distinguished from each other because of the different frequencies transmitted by the transmitters disposed on digital pen 206 (e.g., "beep" at different frequencies) or because of the different times with unique patterns transmitted by the transmitters disposed on digital pen 206.

Processing component 232 may perform the following projections:

Point $P_1$ to a point in the plane where z=0 with (x, y) coordinates (0, 0) (e.g., three-dimensional coordinates [0, 0, 0]);

Point $P_2$ to a point in the plane where z=0 with (x, y) coordinates (w, 0) (e.g., three-dimensional coordinates [w, 0, 0]), where w is the width of the rectangle on base station 208 or notepad 204 defined by the transmitters disposed on digital pen 206; and Point $P_3$ to a point in the plane where z=0 with (x, y) coordinates (0, h) (e.g., three-dimensional coordinates [0, h, 0]), where h is the height of the rectangle on base station 208 or notepad 204 defined by the transmitters disposed on digital pen 206. The projection may be performed, for instance, with a 3×3 matrix transformation A and a three-dimensional translation vector $\vec{v2}$, as shown in equations (11)-(13):

$$P_1 \cdot A + v = [0,0,0] \quad (11),$$

$$P_2 \cdot A + v = [w,0,0] \quad (12),$$

$$P_3 \cdot A + v = [0,h,0] \quad (13).$$

Processing component 232 may record the three-dimensional position of the tip of digital pen 206 based on the projection, where the recorded three-dimensional position of the tip represents an object that is drawn by the user on notepad 204 using digital pen 206. In an example, the three-dimensional position of the tip is represented as three numbers (e.g., the x, y, and z coordinates). In particular, the object is representative of movement of the digital pen 206 across notepad 204. These coordinates may be made available to applications (e.g., e-notepad application 236) that are executing on computing device 202 and that record the user's writing on notepad 204. Processing component 232 may store the coordinates in memory 234 and display the object on a display 310 coupled to computing device 202.

Figure 4:
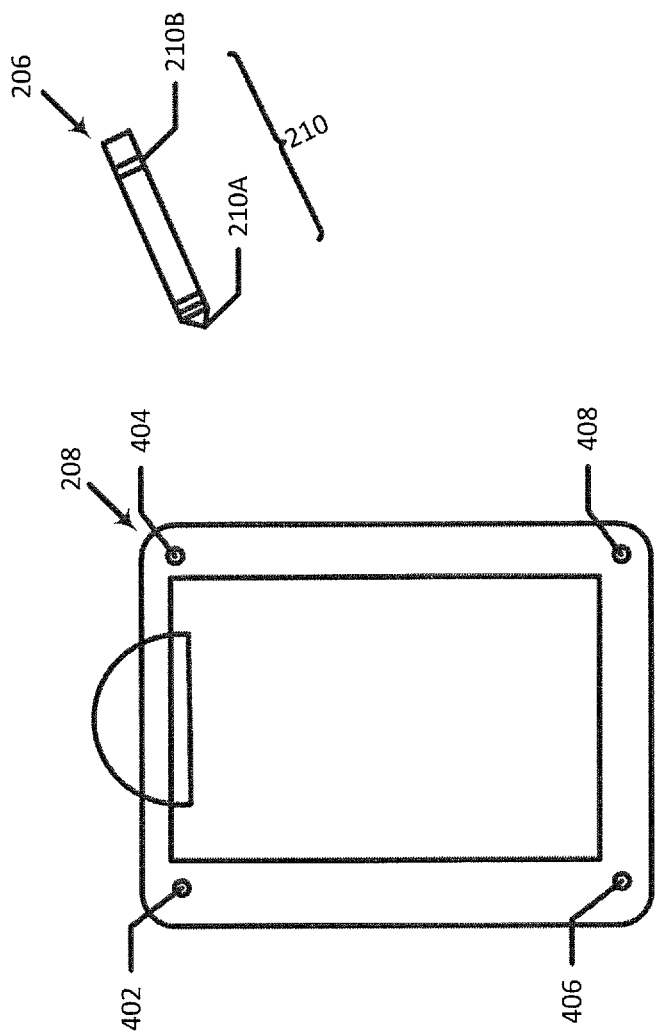
FIG. 4 illustrates a base station, consistent with some embodiments.

As discussed above and further emphasized here, FIGS. 1-3 are merely examples, which should not unduly limit the scope of the claims. Other embodiments of base station 208 are within the scope of the disclosure. For example, FIG. 4 illustrates a base station 208, consistent with some embodiments. In FIG. 4, base station 208 includes four processing units or "buttons" 402, 404, 406, and 408 that contain a battery, loudspeaker, and control unit, and that are gluable on a surface. The processing units may be attached to three or four corners of a clipboard of the user's choice. The clipboard may be any generic clipboard. In such an embodiment, the clipboard may be referred to as the base station.

The three or more processing units may emit their pulses at different times once moved, at different frequencies/signals (in order to allow computing device 202 to better detect their positions), or a combination of these. In FIG. 4, base station 208 does not contain set of receivers 230. Rather, base station 208 interacts with computing device 202, which contains set of receivers 230. Accordingly, it may be unnecessary for base station 208 to process the positions of the processing units and store them on the clipboard until these are retrieved by computing device 202. An advantage of this embodiment may provide for cost savings because it may be expensive to manufacture a base station 208 that processes and stores coordinates for later use. Rather, computing device 202 may be used to process and store the coordinates and uses less complicated onboard circuitry compared to a base station that performs these actions.

Additionally, in some embodiments, processing component 232 may calculate a TDOA for each acoustic signal received at a plurality of receivers of set of receivers 230. Acoustic tracking systems that determine a position based on a TDOA and may do so without using a synchronization channel. In this way, it may be unnecessary to add additional hardware to acoustic tracking system 200 and to modify software based on the additional hardware. Non-synchronized systems may use multiple receivers for receiving the emitted acoustical signal and calculating a Differential Time of Arrival ("DTOA") that is a time delay measured between the multiple receivers.

Additionally, although TDOA is described to determine the position of a transmitter, this is not intended to be limiting and other techniques may be used. For example, an acoustic tracking system may determine the position of the transmitter based on a TOA that may be synchronized. Synchronized systems may use a synchronization signal that has a speed that is faster than the speed of sound and is transmitted to the receiver for synchronizing the clocks of the transmitter and receiver. Additional modules may be placed on receiving device 202 to receive the synchronization signal from the transmitters.

Based on the received signal, processing component 232 may calculate the TOF and may perform triangulation or other form of multilateration to determine the position of the transmitting device as a function of time. In synchronized acoustic signal-based position systems, an infrared (IR) signal may be used for synchronization due to its low cost and low power requirements. IR may be a cost effective, low power synchronization method. Another synchronization signal that may be used is a radio wave synchronization signal. However, using a radio wave as a synchronization signal may still require a dedicated hardware synchronization block between the radio wave circuitry and the audio processing circuitry to maintain the required synchronization. Moreover, generating and receiving a radio wave synchronization signal may use more power than generating and receiving an IR signal.

Figure 5:
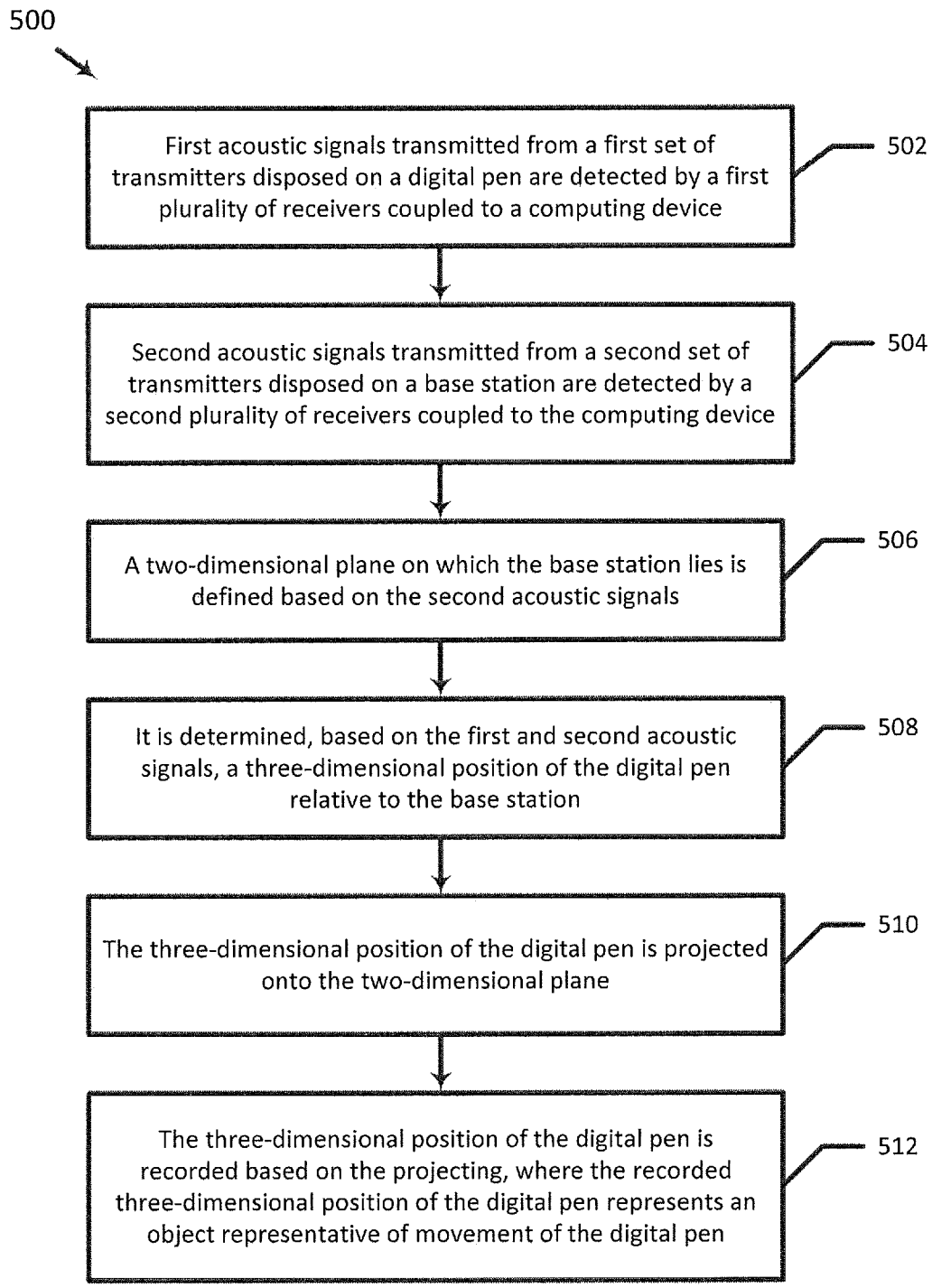
FIG. 5 is a flowchart illustrating a method of recording an object based on movement of a digital pen relative to a base station, consistent with some embodiments.

FIG. 5 is a flowchart illustrating a method 500 of recording an object based on movement of a digital pen relative to a base station, consistent with some embodiments. Method 500 is not meant to be limiting and may be used in other applications.

Method 500 includes blocks 502-512. In a block 502, first acoustic signals transmitted from a first set of transmitters disposed on a digital pen are detected by a first plurality of receivers coupled to a computing device. In an example, a first plurality of receivers of set of receivers 230 detects acoustic signals 242 transmitted from set of transmitters 210 disposed on digital pen 206.

In a block 504, second acoustic signals transmitted from a second set of transmitters disposed on a base station are detected by a second plurality of receivers coupled to the computing device. In an example, a second plurality of receivers of set of receivers 230 detects acoustic signals 240 transmitted from set of transmitters 220 disposed on base station 208. One or more receivers of the first and second pluralities of receivers may overlap.

In a block 506, a two-dimensional plane on which the base station lies is defined based on the second acoustic signals. In an example, processing component 232 defines, based on acoustic signals 240, two-dimensional plane 302 on which base station 208. In a block 508, it is determined, based on the first and second acoustic signals, a three-dimensional position of the digital pen relative to the base station. In an example, processing component 232 determines, based on acoustic signals 240 and 242, a three-dimensional position of digital pen 206 relative to base station 208.

In a block 510, the three-dimensional position of the digital pen is projected onto the two-dimensional plane. In an example, processing component 232 projects the three-dimensional position of digital pen 206 onto two-dimensional plane 302. Processing component 232 may project the three-dimensional position of the tip of digital pen 206 onto two-dimensional plane 302.

In a block 512, the three-dimensional position of the digital pen is recorded based on the projecting, where the recorded three-dimensional position of the digital pen represents an object representative of movement of the digital pen. In an example, processing component 232 records the three-dimensional position of the digital pen based on the projecting, where the recorded three-dimensional position of the digital pen represents an object representative of movement of the digital pen. Processing component 232 may record the three-dimensional position of the digital pen's tip based on the projecting, where the recorded three-dimensional position of the tip represents an object representative of movement of the digital pen.

It is also understood that additional processes may be performed before, during, or after blocks 502-512 discussed above. For example, method 500 may include a process of extracting acoustic signals received by each receiver of set of receivers 230. It is also understood that one or more of the blocks of method 500 described herein may be omitted, combined, or performed in a different sequence as desired.

Figure 6:
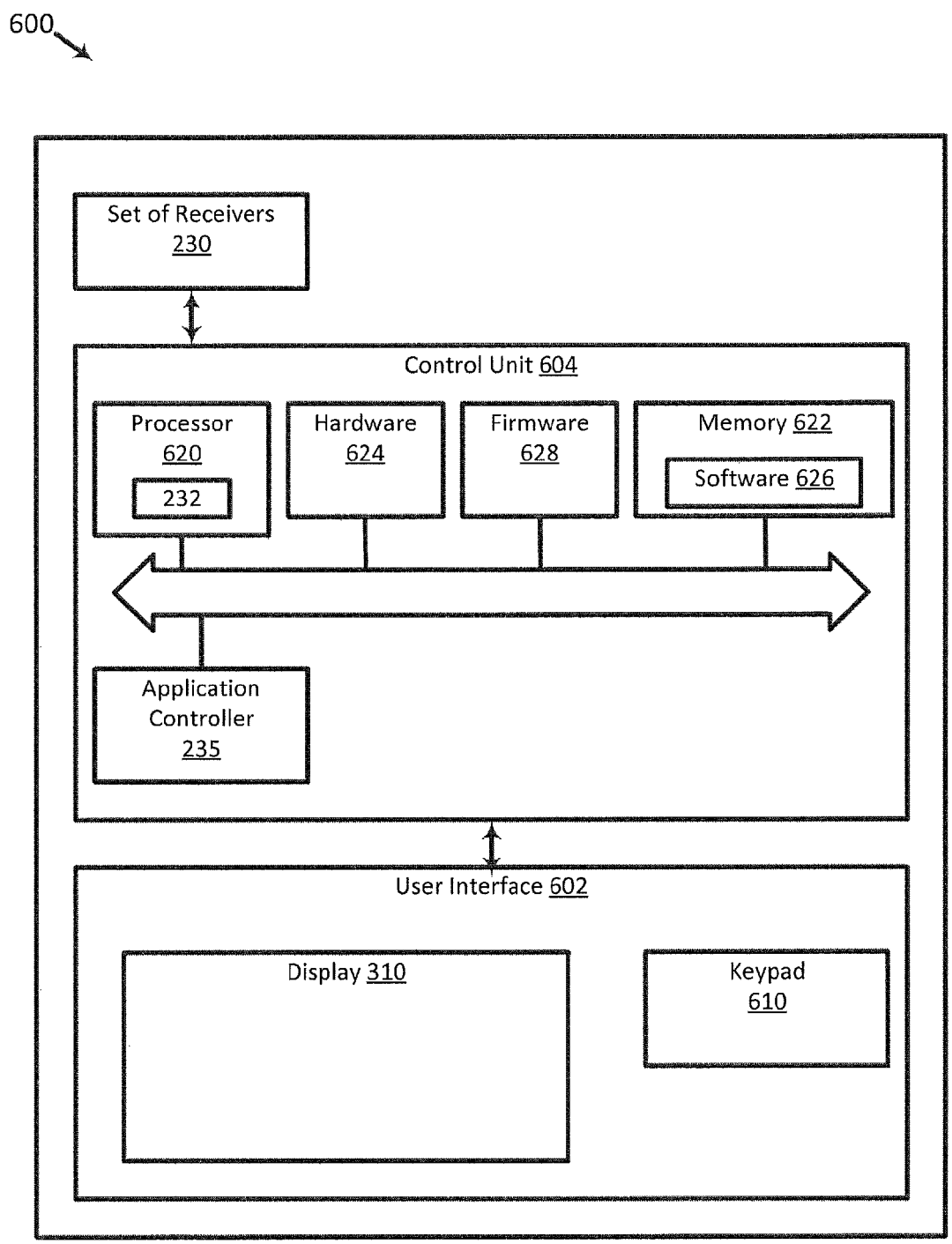
FIG. 6 is a diagram illustrating a platform capable of recording an object based on movement of a digital pen relative to a base station, consistent with some embodiments.

FIG. 6 is a diagram illustrating a platform capable of recording an object based on movement of a digital pen relative to a base station, consistent with some embodiments.

Computing device 202 may run a platform 600. Platform 600 includes a user interface 602 that is in communication with a control unit 604, e.g., control unit 604 accepts data from set of receivers 230 and controls user interface 602. User interface 602 includes display 310, which includes a means for displaying graphics, text, and images, such as an LCD or LPD display.

User interface 602 may further include a keypad 610 or other input device through which the user can input information into the platform 600. If desired, keypad 610 may be obviated by integrating a virtual keypad into display 310. It should be understood that with some configurations of platform 600, portions of user interface 602 may be physically separated from control unit 604 and connected to control unit 604 via cables or wirelessly, for example, in a Bluetooth headset.

Control unit 604 accepts and processes data from set of receivers 230 and controls the operation of the devices. For example, processing component 232 may extract acoustic signals received by set of receivers 230 and process the signals to define a two-dimensional plane on which a base station lies and to determine a three-dimensional position of a digital pen relative to the base station. Processing component 232 may project the three-dimensional position of the tip onto the two-dimensional plane and record the three-dimensional position of the tip based on the projecting, where the recorded three-dimensional position of the tip represents an object representative of movement of the digital pen. Application controller 235 may use the recorded positions to affect operation of e-notepad application 236.

Platform 600 may include means for detecting first acoustic signals transmitted from a first set of transmitters disposed on digital pen 206. Platform 600 may further include means for detecting second acoustic signals transmitted from a second set of transmitters disposed on base station 208. Platform m 600 may further include means for defining, based on the second acoustic signals, a two-dimensional plane on which the base station lies. Platform 600 may further include means for determining, based on the first and second acoustic signals, a three-dimensional position of the digital pen relative to the base station. Platform 600 may further include means for projecting the three-dimensional position of the tip onto the two-dimensional plane. Platform 600 may further include means for recording the three-dimensional position of the tip based on the projecting, where the recorded three-dimensional position of the tip represents an object representative of movement of the digital pen.

Control unit 604 may be provided by one or more processors 620 and associated memory 622, hardware 624, software 626, and firmware 628. Control unit 604 includes a means for controlling display 310 and means for controlling application controller 235. Application controller 235 may be implanted in processor 620, hardware 624, firmware 628, or software 626, e.g., computer readable media stored in memory 622 and executed by processor 620, or a combination thereof.

As discussed above and further emphasized here, FIGS. 1-6 are merely examples that should not unduly limit the scope of the claims. It will also be understood as used herein that processor 620 can, but need not necessarily include, one or more microprocessors, embedded processors, controllers, application specific integrated circuits (ASICs), digital signal processors (DSPs), graphics processing units (GPUs), and the like. The term processor is intended to describe the functions implemented by the system rather than specific hardware. Moreover, as used herein the term "memory" refers to any type of computer storage medium, including long term, short term, or other memory associated with the platform, and is not to be limited to any particular type of memory or number of memories, or type of media upon which memory is stored.

The methodologies described herein may be implemented by various means depending upon the application. For example, these methodologies may be implemented in hardware 624, firmware 628, software 626, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 622 and executed by the processor 620. Memory may be implemented within the processor unit or external to the processor unit.

For example, software 626 may include program codes stored in memory 622 and executed by processor 620 and may be used to run the processor and to control the operation of platform 600 as described herein. A program code stored in a computer-readable medium, such as memory 622, may include program code to record an object based on movement of a digital pen relative to a base station. The program code stored in a computer-readable medium may additionally include program code to cause the processor to control any operation of platform 600 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

One skilled in the art may readily devise other systems consistent with the disclosed embodiments which are intended to be within the scope of this disclosure. The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. An acoustic tracking system, comprising:
    a first plurality of receivers that detects first acoustic signals from a first set of transmitters disposed on a digital pen;
    a second plurality of receivers that detects second acoustic signals from a second set of transmitters disposed on a base station, wherein the first plurality of receivers and the second plurality of receivers are disposed on a computing device separate from the digital pen and base station;
    a processing component that defines, based on the second acoustic signals, a two-dimensional plane on which the base station lies, determines, based on the first and second acoustic signals, a three-dimensional position of the digital pen relative to the base station, and projects the three-dimensional position of the digital pen onto the two-dimensional plane; and
    an application controller that records, based on the projected three-dimensional position of the digital pen onto the two-dimensional plane, the three-dimensional position of the digital pen relative to the base station, wherein the recorded three-dimensional position of the digital pen represents an object representative of movement of the digital pen.

2. The acoustic tracking system of claim 1, wherein the processing component determines a distance between the two-dimensional plane and the three-dimensional position of the digital pen relative to the base station, and wherein in response to determining that the distance is within a threshold distance, the processing component projects the three-dimensional position of the digital pen onto the two-dimensional plane.

3. The acoustic tracking system of claim 1, wherein the three-dimensional position of the digital pen relative to the base station is a three-dimensional position of a tip of the digital pen relative to the base station.

4. The acoustic tracking system of claim 1, wherein a first transmitter disposed on the digital pen is located at a tip of the digital pen.

5. The acoustic tracking system of claim 1, wherein the processing component extracts acoustic signals received at one or more receivers and determines which transmitter transmitted the respective acoustic signal.

6. The acoustic tracking system of claim 5, wherein the processing component calculates a time difference of arrival for each acoustic signal received at the first and second plurality of receivers.

7. The acoustic tracking system of claim 6, wherein the processing component applies a least square algorithm to one or more calculated time difference of arrivals to determine positions of the first and second set of transmitters.

8. The acoustic tracking system of claim 1, wherein the processing component displays, based on the recorded three-dimensional position of the digital pen, the object on a screen coupled to the processing component.

9. The acoustic tracking system of claim 1, wherein the processing component is included in a device that is at least one of a smartphone, tablet computer, personal digital assistant, and laptop.

10. The acoustic tracking system of claim 1, wherein the base station includes a motion detector that detects movement of the base station, and wherein in response to the movement, the base station activates the second set of transmitters to emit the second acoustic signals.

11. The acoustic tracking system of claim 1, wherein the base station includes a button, and wherein in response to the button being pressed, the base station activates the second set of transmitters to emit the second acoustic signals.

12. The acoustic tracking system of claim 1, wherein the processing component stores the recorded three-dimensional position of the digital pen in memory.

13. The acoustic tracking system of claim 1, wherein an orientation of the base station is independent of an orientation of the digital pen.

14. The acoustic tracking system of claim 1, wherein in response to determining that the distance is within the threshold distance, the processing component transforms the three-dimensional position of the digital pen into a two-dimensional coordinate system relative to the base station and the base station's spatial orientation.

15. A method of recording an object based on movement of a digital pen relative to a base station, comprising:
    detecting, by a first plurality of receivers coupled to a computing device, first acoustic signals transmitted from a first set of transmitters disposed on a digital pen;
    detecting, by a second plurality of receivers coupled to the computing device, second acoustic signals transmitted from a second set of transmitters disposed on a base station, wherein the first plurality of receivers and the second plurality of receivers are disposed on the computing device separate from the digital pen and base station;
    defining, based on the second acoustic signals, a two-dimensional plane on which the base station lies;
    determining, based on the first and second acoustic signals, a three-dimensional position of the digital pen relative to the base station;
    projecting the three-dimensional position of a tip of the digital pen onto the two-dimensional plane; and
    recording the three-dimensional position of the tip based on the projecting, wherein the recorded three-dimensional position of the tip represents an object representative of movement of the digital pen.

16. The method of claim 15, wherein the determining a three-dimensional position of the digital pen includes determining, based on the first and second acoustic signals, a three-dimensional position of a tip of the digital pen relative to the base station.

17. The method of claim 16, further comprising:
    determining a distance between the two-dimensional plane and the three-dimensional position of the tip of the digital pen relative to the base station, wherein the projecting includes in response to determining that the distance is within a threshold distance, projecting the three-dimensional position of the tip onto the two-dimensional plane.

18. The method of claim 15, further comprising:
    displaying, based on the recorded three-dimensional position of the tip, the object on a display coupled to the computing device.

19. The method of claim 15, further comprising:
    detecting, by a motion sensor coupled to the base station, a movement of the base station; and
    in response to detecting the movement, activating the second set of transmitters to emit the second acoustic signals.

20. A computer-readable medium having stored thereon computer-executable instructions for performing operations, comprising:
    detecting first acoustic signals transmitted from a first set of transmitters disposed on a digital pen;
    detecting second acoustic signals transmitted from a second set of transmitters disposed on a base station, wherein the first plurality of receivers and the second plurality of receivers are disposed on a computing device separate from the digital pen and base station;
    defining, based on the second acoustic signals, a two-dimensional plane on which the base station lies;
    determining, based on the first and second acoustic signals, a three-dimensional position of the digital pen relative to the base station;
    projecting the three-dimensional position of the digital pen onto the two-dimensional plane; and
    recording the three-dimensional position of the digital pen based on the projecting, wherein the recorded three-dimensional position represents an object representative of movement of the digital pen.

21. The computer-readable medium of claim 20, wherein the computer-executable instructions for performing operations further comprise:
    determining a distance between the two-dimensional plane and the three-dimensional position of the digital pen relative to the base station; and
    determining whether the distance is within a threshold distance, wherein the projecting includes in response to determining that the distance is within the threshold distance, projecting the three-dimensional position of the digital pen onto the two-dimensional plane.

22. The computer-readable medium of claim 20, wherein the three-dimensional position of the digital pen relative to the base station is a three-dimensional position of a tip of the digital pen relative to the base station.

23. The computer-readable medium of claim 20, further comprising:
detecting movement of the base station; and
in response to the detected movement, activating the second set of transmitters to emit the second acoustic signals.

24. The computer-readable medium of claim 20, further comprising:
displaying, based on the recorded three-dimensional position of the digital pen, the object on a screen coupled to the processing component.

25. An apparatus for recording an object based on movement of a digital pen relative to a base station, comprising:
means for detecting first acoustic signals transmitted from a first set of transmitters disposed on a digital pen;
means for detecting second acoustic signals transmitted from a second set of transmitters disposed on a base station, wherein the first plurality of receivers and the second plurality of receivers are disposed on a computing device separate from the digital pen and base station;
means for defining, based on the second acoustic signals, a two-dimensional plane on which the base station lies;
means for determining, based on the first and second acoustic signals, a three-dimensional position of the digital pen relative to the base station;
means for projecting the three-dimensional position of the digital pen onto the two-dimensional plane; and
means for recording the three-dimensional position of the digital pen based on the projecting, wherein the recorded three-dimensional position of the digital pen represents an object representative of movement of the digital pen.

26. The apparatus of claim 25, further comprising:
means for determining a distance between the two-dimensional plane and the three-dimensional position of the digital pen relative to the base station; and
means for determining whether the distance is within a threshold distance, wherein the three-dimensional position of the digital pen is projected onto the two-dimensional plane when the distance is within the threshold distance.

27. The apparatus of claim 25, wherein the three-dimensional position of the digital pen relative to the base station is a three-dimensional position of a tip of the digital pen relative to the base station.

28. The apparatus of claim 25, further comprising:
means for detecting movement of the base station; and
means for in response to the detected movement, activating the second set of transmitters to emit the second acoustic signals.

29. The apparatus of claim 25, further comprising:
means for displaying, based on the recorded three-dimensional position of the digital pen, the object on a screen coupled to the processing component.

* * * * *